No. 639,280. Patented Dec. 19, 1899.
F. J. PERKINS.
BAND SAW GUIDE.
(Application filed July 14, 1899.)
(No Model.)
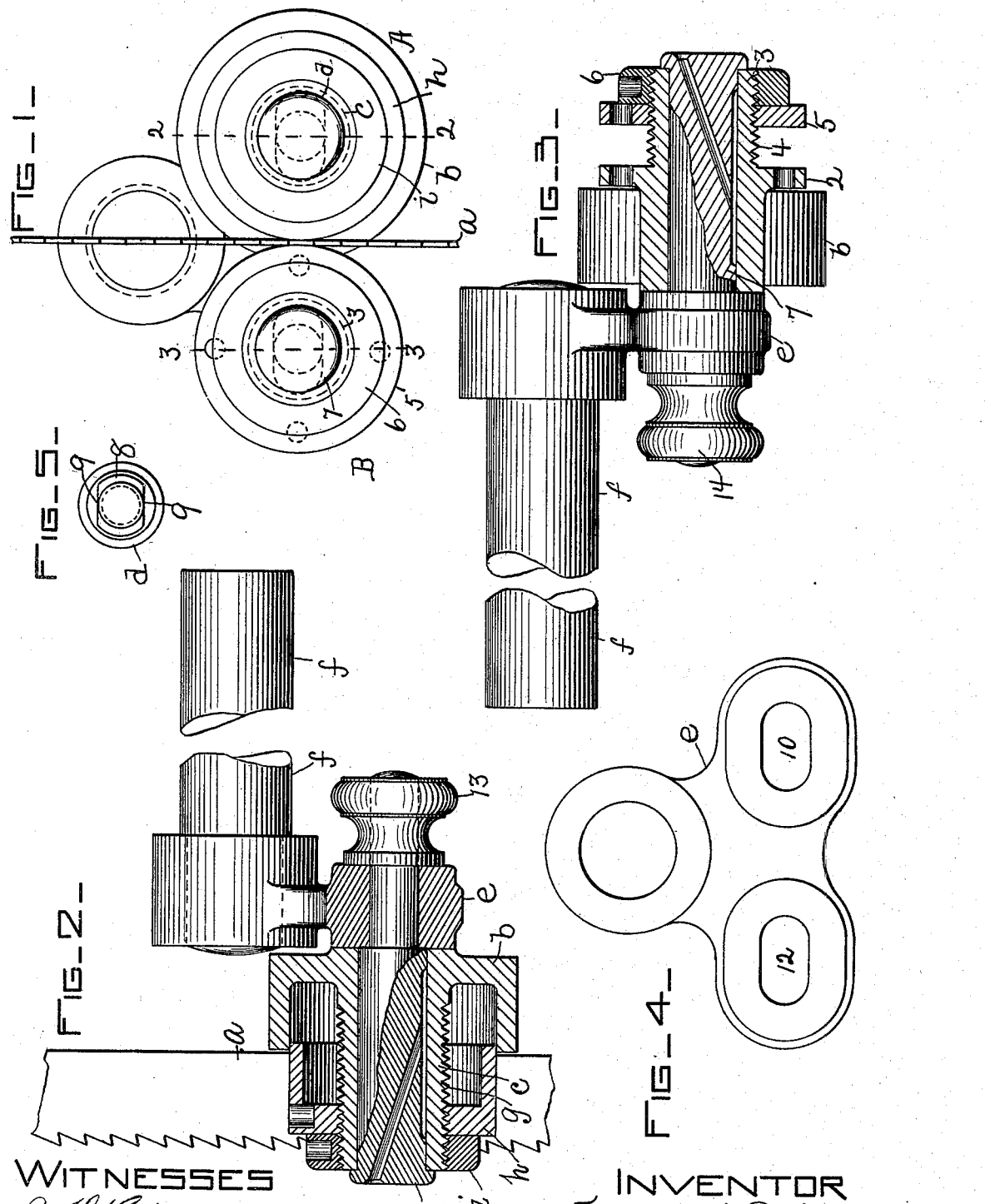
WITNESSES
INVENTOR
Franklin J. Perkins
by Jas. H. Churchill
Atty.

UNITED STATES PATENT OFFICE.

FRANKLIN J. PERKINS, OF WOBURN, MASSACHUSETTS, ASSIGNOR TO THE VAUGHN MACHINE COMPANY, OF PORTLAND, MAINE.

BAND-SAW GUIDE.

SPECIFICATION forming part of Letters Patent No. 639,280, dated December 19, 1899.

Application filed July 14, 1899. Serial No. 723,814. (No model.)

*To all whom it may concern:*

Be it known that I, FRANKLIN J. PERKINS, a citizen of the United States, residing in Woburn, in the county of Middlesex and State of Massachusetts, have invented an Improvement in Band-Saw Guides, of which the following description, in connection with the accompanying drawings, is a specification, like letters and figures on the drawings representing like parts.

This invention relates to a guide for band-saws, and has for its object to provide a guide with which the band-saw may be supported for substantially the entire width of the blade back of the teeth with a minimum friction, whereby the band-saw is caused to run true and avoids twisting when turning small curves. The guide is made adjustable to enable it to be used with saws of different widths and thicknesses. These and other features of this invention will be pointed out in the claims at the end of this specification.

Figure 1 is a front elevation of a band-saw guide embodying this invention; Fig. 2, a partial section and elevation of the guide shown in Fig. 1, the section being taken on the line 2 2; Fig. 3, a partial section and elevation of the guide shown in Fig. 1, the section being taken on the line 3 3, Fig. 1; and Figs. 4 and 5, details to be referred to.

The saw-guide herein shown as embodying this invention comprises two sets of disks, wheels, or rolls A B, arranged so that their peripheries bear against the opposite sides of the band-saw $a$.

The set A of disks, wheels, or rolls is composed of a substantially large hollow disk or roll $b$, (see Fig. 2,) provided with a substantially long hub $c$, which projects beyond the front face of its rim and is loosely mounted upon a stud or shaft $d$, adjustably secured in a carrier $e$, which is provided with a stem or projection $f$, by which the carrier may be secured to the framework of the machine. (Not herein shown.) The hub $c$ is provided on its circumference with screw-threads $g$, adapted to be engaged by the internally-threaded hub of a roll, disk, or wheel $h$ of a diameter less than the internal diameter of the disk, wheel, or roll $b$, so that the disk or roll $h$ may be moved into and out of the roll or wheel $b$ to adapt the periphery of the wheel or roll $h$ to the width of the saw to be guided. The disk or roll $h$ is provided with a substantially wide periphery, so as to support or bear against substantially wide band-saws, and the said roll or disk may be retained on the hub $c$ by a nut $i$.

The second set B of disks, rolls, or wheels (see Fig. 3) comprises a substantially narrow disk or wheel 2, having a substantially long hub 3 extended from opposite sides of the disk or wheel and provided at the front side thereof with screw-threads 4, which are engaged by screw-threads on the interior of a substantially narrow disk or wheel 5, which is retained on the threaded hub by a nut 6. The hub of the disk or wheel 2 is loose on a stud or shaft 7, secured to the carrier $e$. The studs or shafts $d$ 7 are provided with extensions 8, which, as represented in Fig. 5, are provided with straight or flattened upper and lower surfaces 9, which prevent the said studs or shafts from turning when inserted into the laterally-extended slots 10 12 in the carrier, the said studs or shafts being firmly secured to the carrier by nuts 13 14. The slots 10 12 permit the sets A B of the guiding disks or rolls to be adjusted laterally, so as to coöperate with band-saws of different thickness.

In the present instance the band-saw is represented as substantially wide, and by reference to Figs. 2 and 3 it will be seen that on one side of the saw the wide disk or wheel $h$ makes peripheral contact with the saw from a point immediately back of the teeth to the back edge of the saw, and by reference to Fig. 3 it will be noticed that the substantially narrow disks or wheels are separated about the same distance, so that they also bear against the opposite side of the band-saw, one near the back of the teeth and the other near the back edge of the saw.

By reference to Fig. 1 it will be seen that the back edge of the saw bears against the front face of the rim of the hollow roll or wheel $b$. It will thus be seen that the band-saw is firmly supported at its back and opposite sides with a minimum friction, as the saw touches the rolls or disks tangentially, and the said rolls or disks are free to revolve, thus reducing the friction and wear to a minimum, while at the same time the wide bearing or support for the saw prevents twisting of the saw, especially when turning small curves.

The guide is adjustable for saws of different thickness, as above described, and is further adjustable for saws of different widths, for if the guide is to be used with a narrower saw than that shown in Fig. 2 the disk or roll $h$ is turned on the hub $c$ and moved within the rim of the disk or wheel $b$ and then locked in this position by the nut $i$, and the disk 5 is turned on the hub 4 to bring it nearer the disk 2 and then locked by the nut 6.

I claim—

1. In a band-saw guide, the combination with a disk, wheel or roll provided with a substantially wide periphery, adapted to make contact with one side of the saw to be guided, a threaded hub on which said disk or wheel is mounted, and a nut to secure said disk or wheel on said threaded hub, of coöperating narrower disks, wheels or rolls adapted to make contact with the opposite side of the said saw, one of the said narrower disks being provided with a threaded hub and the other of said narrower disks being adjustable on said hub, and a nut to engage said threaded hub and secure said narrower movable disk in its adjusted position, substantially as described.

2. In a band-saw guide, the combination with a hollow disk or wheel provided with a hub projecting beyond the face of the rim of said disk or wheel, and a disk or wheel of smaller diameter mounted on the said hub and adjustable thereon, and within the rim of the hollow disk or wheel, of a coöperating set of disks or wheels comprising a substantially narrow disk or wheel provided with an extended hub, and a second narrow disk mounted on the hub of the first-mentioned narrow disk, substantially as described.

3. In a band-saw guide, the combination with a hollow disk, wheel or roll provided with a rim and an extended hub, of a disk, wheel or roll of smaller diameter adjustably mounted on said hub and movable within the rim of the said hollow wheel, and a disk or wheel coöperating with the opposite side of the band-saw, substantially as described.

In testimony whereof I have signed my name to this specification in the presence of two subscribing witnesses.

FRANKLIN J. PERKINS.

Witnesses:
BESSIE H. STREAMBERG,
HATTIE A. NEWCOMB.